(12) United States Patent
Wu et al.

(10) Patent No.: US 12,096,503 B2
(45) Date of Patent: Sep. 17, 2024

(54) METHOD AND APPARATUS FOR HANDLING RADIO LINK FAILURE

(71) Applicant: LENOVO (BEIJING) LIMITED, Beijing (CN)

(72) Inventors: Lianhai Wu, Beijing (CN); Haiming Wang, Beijing (CN); Jing Han, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 749 days.

(21) Appl. No.: 17/265,639

(22) PCT Filed: Aug. 3, 2018

(86) PCT No.: PCT/CN2018/098556
§ 371 (c)(1),
(2) Date: Feb. 3, 2021

(87) PCT Pub. No.: WO2020/024269
PCT Pub. Date: Feb. 6, 2020

(65) Prior Publication Data
US 2021/0315040 A1  Oct. 7, 2021

(51) Int. Cl.
*H04W 76/19* (2018.01)
*H04W 48/20* (2009.01)
*H04W 76/27* (2018.01)
*H04W 76/30* (2018.01)
*H04W 80/02* (2009.01)
*H04W 88/14* (2009.01)

(52) U.S. Cl.
CPC ........... *H04W 76/19* (2018.02); *H04W 48/20* (2013.01); *H04W 76/27* (2018.02); *H04W 76/30* (2018.02); *H04W 80/02* (2013.01); *H04W 88/14* (2013.01)

(58) Field of Classification Search
CPC ..... H04W 76/19; H04W 76/30; H04W 76/27; H04W 48/20; H04W 80/02; H04W 88/14; H04W 92/14; H04W 88/08; H04W 24/04; H04W 36/003; H04W 76/10; H04L 12/00
See application file for complete search history.

(56) References Cited

U.S. PATENT DOCUMENTS

| | | | |
|---|---|---|---|
| 2012/0314567 A1 | 12/2012 | Seo et al. | |
| 2012/0327801 A1* | 12/2012 | Seo | H04B 1/74 370/252 |
| 2022/0053590 A1* | 2/2022 | Ma | H04W 76/19 |
| 2022/0294514 A1* | 9/2022 | Kang | H04L 5/005 |
| 2023/0013751 A1* | 1/2023 | Zhou | H04B 7/0626 |

OTHER PUBLICATIONS

"Backhaul link reselection" May 21-25, 2018 (Year: 2018).*
3GPP, 3rd Generation Partnership Project; Technical Specification Group Radio Access Network; Consideration of HO for unreliable HeNB, 3GPP R2-094022, Jun.-Jul. 2009, pp. 1-5.
(Continued)

*Primary Examiner* — Mewale A Ambaye
(74) *Attorney, Agent, or Firm* — Kunzler Bean & Adamson

(57) ABSTRACT

The present disclosure relates to methods and apparatuses. According to some embodiments of the disclosure, one method includes: transmitting, at a communication device, a signaling message indicating a failure in a backhaul link.

20 Claims, 8 Drawing Sheets

(56) References Cited

OTHER PUBLICATIONS

3GPP, 3rd Generation Partnership Project; Technical Specification Group Radio Access Network; Backhaul link reselection, 3GPP R2-1807902 May 2018, pp. 1-4.

International Searching Authority, "Notification of Transmittal of the International Search Report and the Written Opinion of the International Searching Authority, or the Declaration", PCT/IB2018/098556, Aug. 3, 2018, pp. 1-6.

Alcatel-Lucent, "Radio link failure handling by RN", 3GPP TSG-RAN WG2 Meeting #70bis, R2-103682, Jul. 28-2, 2010, pp. 1-4, Stockholm, Sweden.

* cited by examiner

METHOD AND APPARATUS FOR HANDLING RADIO LINK FAILURE

TECHNICAL FIELD

The present disclosure generally relates to wireless communication technology, especially for handling a radio link failure in a wireless communication system.

BACKGROUND

In the 3rd Generation Partnership Project (3GPP), deployment of Relay Nodes (hereinafter referred to as RNs) in a wireless communication system is promoted. One of the main objectives for deploying RNs is to enhance coverage area of a Base Station (hereinafter referred to as BS) by improving throughput of a mobile device (also known as a user equipment (UE)) that locates in a coverage hole or far from the base station resulting in low signal quality.

In a wireless communication system employing RNs, a BS that can provide connection to at least one RN is called a Donor BS. A RN is connected to a Donor BS by a backhaul link. The RN may hop through one or more RNs before reaching the Donor BS, or may be directly connected to the Donor BS. There is a need for handling a failure in the backhaul link when multi-hop is supported in the wireless communication system. In addition, a procedure for selecting a candidate node to re-establish a backhaul link in response to a failure in the backhaul link is desirable.

SUMMARY OF THE DISCLOSURE

One embodiment of the present disclosure provides a method, comprising: transmitting, at a communication device, a signaling message indicating a failure in a backhaul link.

Yet another embodiment of the present disclosure provides a method, comprising: selecting, at a communication device, a candidate node for backhaul link re-establishment in response to a failure in a backhaul link; and transmitting, at the communication device, a re-establishment request to the candidate node.

Yet another embodiment of the present disclosure provides a non-transitory computer-readable medium having stored thereon computer-executable instructions to cause a processor to implement the above method.

Yet another embodiment of the present disclosure provides an apparatus, comprising: a non-transitory computer-readable medium having stored thereon computer-executable instructions to cause a processor to implement the above method; a receiving circuitry; a transmitting circuitry; and a processor coupled to the non-transitory computer-readable medium, the receiving circuitry and the transmitting circuitry.

Yet another embodiment of the present disclosure provides a method, comprising: receiving, from a communication device, a signaling message indicating a failure in a backhaul link.

Yet another embodiment of the present disclosure provides a non-transitory computer-readable medium having stored thereon computer-executable instructions to cause a processor to implement the above method.

Yet another embodiment of the present disclosure provides an apparatus, comprising: a non-transitory computer-readable medium having stored thereon computer-executable instructions to cause a processor to implement the above method; a receiving circuitry; a transmitting circuitry; and a processor coupled to the non-transitory computer-readable medium, the receiving circuitry and the transmitting circuitry.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only example embodiments of the disclosure and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Figure 1:
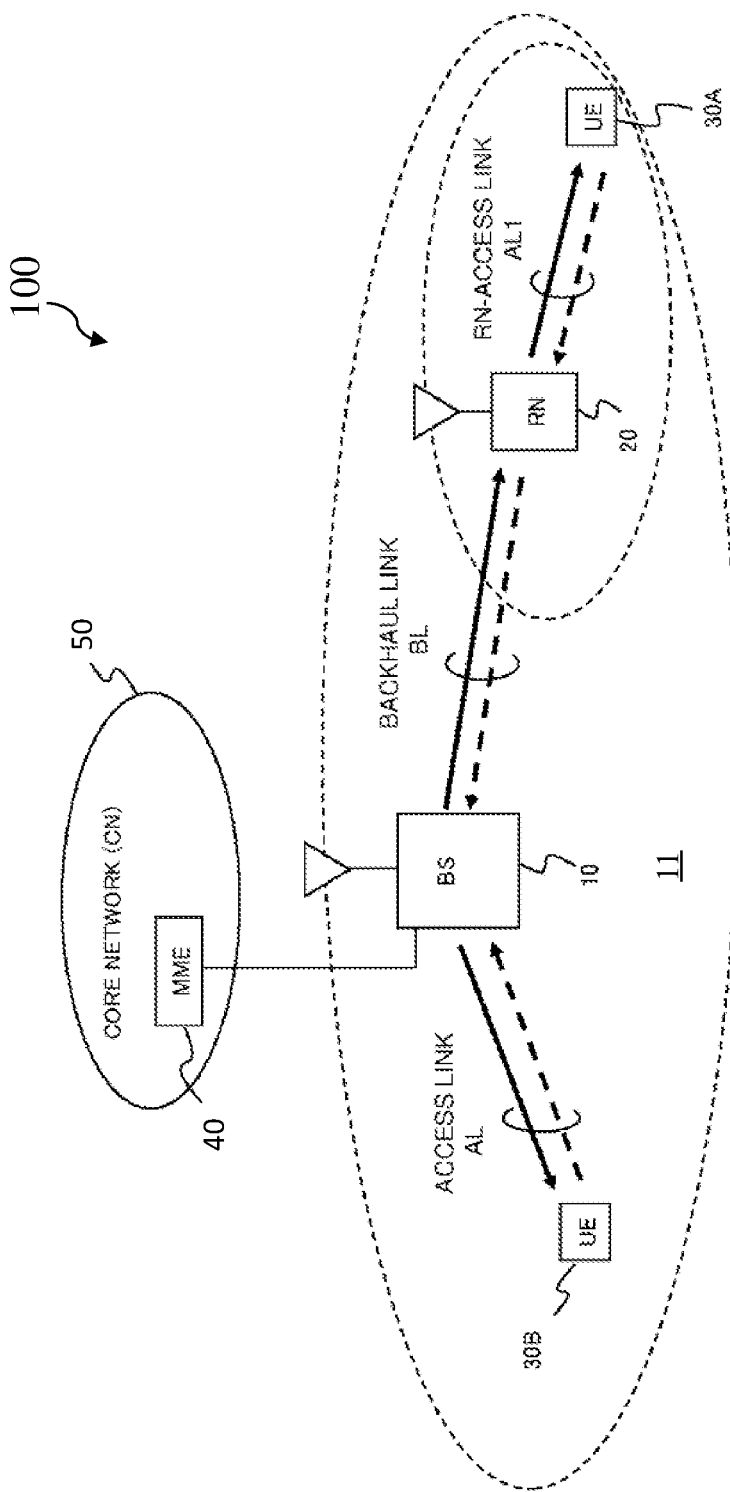
FIG. 1 illustrates a schematic wireless communication system according to an embodiment of the present disclosure.

FIG. 1 illustrates a wireless communication system 100 according to an embodiment of the present disclosure.

As shown in FIG. 1, it is assumed for simplicity that the wireless communication system 100 is comprised of a plurality of nodes, including BS 10, RN 20, and a plurality of UEs 30, including UEs 30A and 30B. It should be noted that the wireless communication system 100 may also comprise of a plurality of BSs and/or a plurality of RNs.

The BS 10 operates under the control of a Mobility Management Entity (MME) 40 and is connecting to a Core Network (CN) 50. The core network also includes a Home Subscriber Server (HSS) (not shown), which is in communication with the MME. The BS 10 may be based, for example, on the standards of Long-Term Evolution (LTE), LTE-Advanced (LTE-A), New Radio (NR), or other suitable standards. For example, the BS 10 may be an eNB or a gNB, and may define one or more cells, such as cell 11. UEs 30A and/or 30B may be a computing device, a wearable device, or a mobile device, etc. Persons skilled in the art should understand that as the 3GPP (3rd Generation Partnership Project) and the communication technology develop, the terminologies recited in the specification may change, which should not affect the principle of the disclosure.

BS 10 provides radio protocol Layer-1 (Physical Layer) to Layer-3 (Radio Resource Control (RRC) Layer) connections to the UE 30B and the RN 20 through an Access Link (AL) and a Backhaul Link (BL), respectively. In some embodiments, the RN 20 provides radio protocol Layer-1 to Layer-3 connections to the UE 30A through a RN-access link (AL1). In other embodiments, the RN 20 provides radio protocol Layer-1 to Layer-2 connections to the UE 30A through the AL1. Since RN 20 is connected to BS 10 by the backhaul link (BL), the BS 10 and the RN 20 correspond to the above-mentioned Donor BS and RN, respectively. Although FIG. 1 shows that the Donor BS 10 and the RN 20 are respectively connected to a single UE, both Donor BS 10 and RN 20 are capable of providing connections to multiple UEs.

Relaying function enables an operator to improve and extend the coverage of a BS by having RN wirelessly connected to the BS. Evolved Universal Terrestrial Radio Access Network (E-UTRAN) supports relaying by having a RN wirelessly connect to an eNB serving the RN, called Donor eNB (DeNB), via a modified version of the Evolved Universal Terrestrial Radio Access (E-UTRA) radio interface, i.e. the backhaul link (BL), also referred to as the Un interface. The radio interface that provides radio protocol connection between RN and the UE is referred to as the Uu interface. The relaying function and use of RN/DeNB entities in a network is transparent to the operations of the UEs connected.

3GPP is envisioning an Integrated Access and Backhaul (IAB) architecture for the 5G (NR) communication networks supporting multi-hop relays. That is, a RN may hop through one or more RNs before reaching the Donor BS. Single hop should be considered a special case of multiple hops. Multi-hop backhauling is beneficial since it provides larger range extension than single-hop backhauling. Higher frequency bands, such as frequency bands above 6 GHz, have limited range of radio signals, and can profit from such larger range extension. Multi-hop backhauling further enables backhauling around obstacles, e.g., buildings in urban environment for in-clutter deployments.

The maximum number of hops in a deployment is expected to depend on a plurality of factors such as frequency, cell density, propagation environment, and traffic load. These factors are expected to change over time. As the number of hops increases, scalability issues may arise. For example, performance may degrade and/or signaling load may increase to unacceptable levels.

Figure 2:
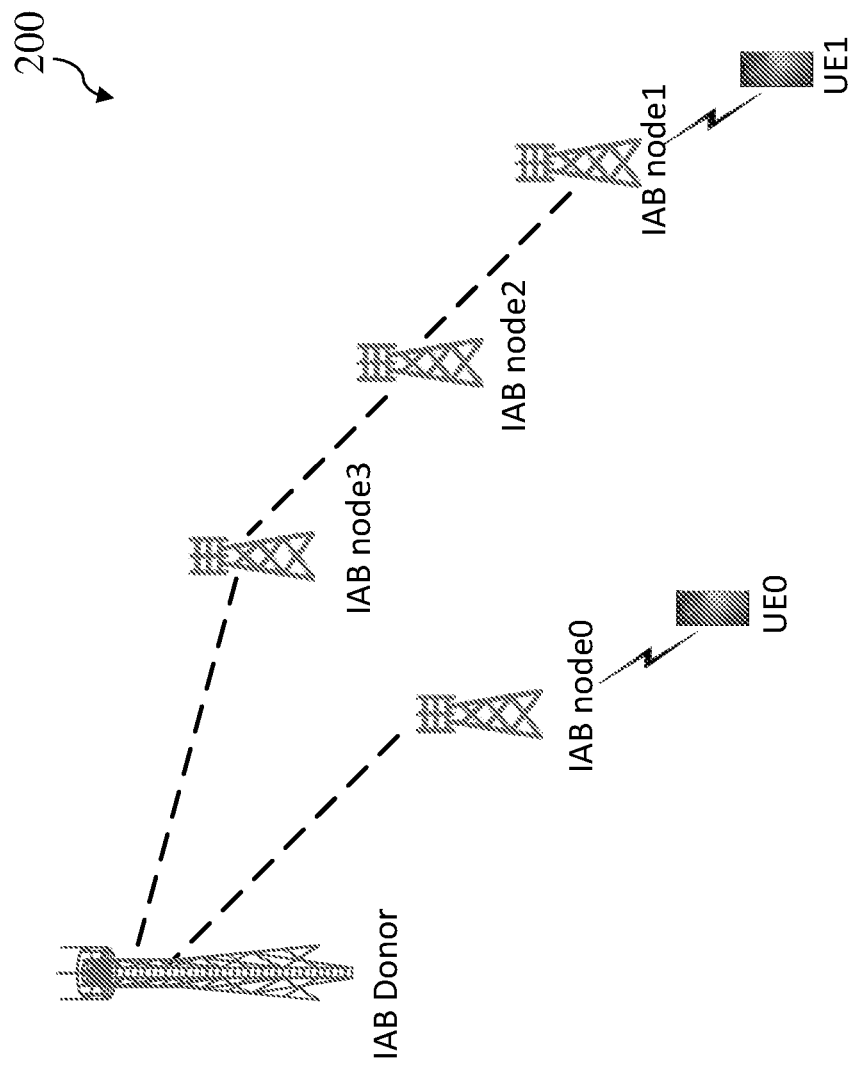
FIG. 2 illustrates a schematic wireless communication system according to an embodiment of the present disclosure.

FIG. 2 illustrates a wireless communication system 200 according to an embodiment of the present disclosure. As shown in FIG. 2, it is assumed for simplicity that the wireless communication system 200 is comprised of a plurality of nodes, including a Donor node, i.e., IAB Donor, a plurality of IAB nodes, including IAB nodes 0-3, and a plurality of UEs, including UE 0 and UE 1. It should be noted that the wireless communication system 200 may also comprise of a plurality of Donor nodes.

In FIG. 2, it is assumed for simplicity that IAB node 0 and IAB node 3 are directly connected to the same Donor node, i.e., IAB Donor. Please note that IAB nodes 0 and 3 may be connected to different Donor nodes. IAB node 2 can reach IAB Donor by hopping through IAB node 3. IAB node 1 can reach IAB Donor by hopping through IAB nodes 2 and 3. UE 0 and UE 1 are connected to IAB node 0 and IAB node 1, respectively. Please note that UE 1 may be connected to one or more IAB nodes (not shown), which are connected to IAB node 1. For example, UE 1 may be connected to IAB node 11 (not shown), which is connected to IAB node 1.

Figure 3:
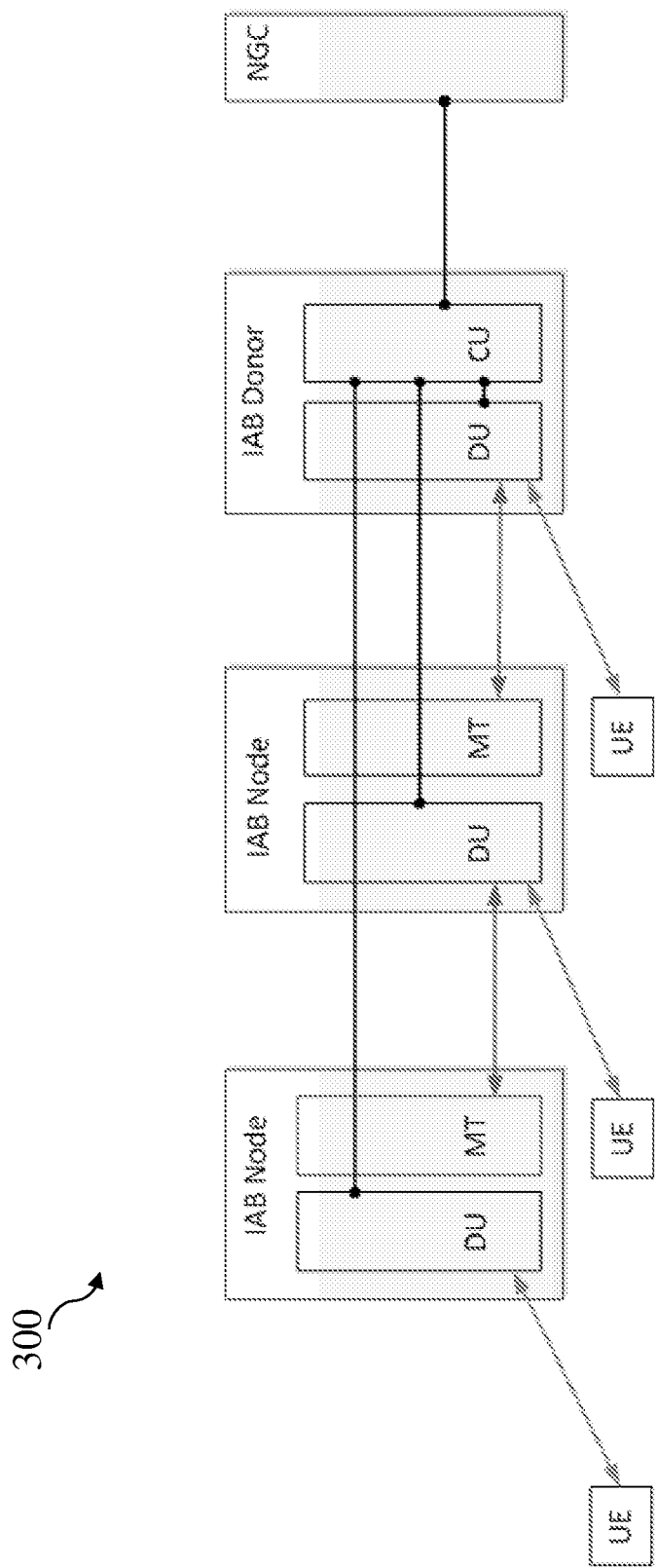
FIG. 3 illustrates a schematic wireless communication system according to an embodiment of the present disclosure.

FIG. 3 illustrates a wireless communication system 300 according to an embodiment of the present disclosure.

As shown in FIG. 3, the IAB nodes and the UEs may be connected to a Next-Generation Core (NGC). Each IAB node may comprise a Distributed Unit (DU) and a Mobile Termination (MT). The IAB nodes may be connected to an upstream IAB node or an IAB donor via the MT, and may be connected to the UEs and a downstream IAB node via the DU. The IAB donor may comprise a DU to support UEs and MTs of downstream IAB nodes. The IAB donor may further comprise a Centralized Unit (CU) for the DUs of all IAB-nodes and for its own DU. The IAB nodes in FIG. 3 may sometimes be referred to as Layer-2 (L2) IAB nodes. In some embodiments, the IAB nodes in FIG. 2, e.g., IAB nodes 0-3, may be L2 IAB nodes.

Figure 4:
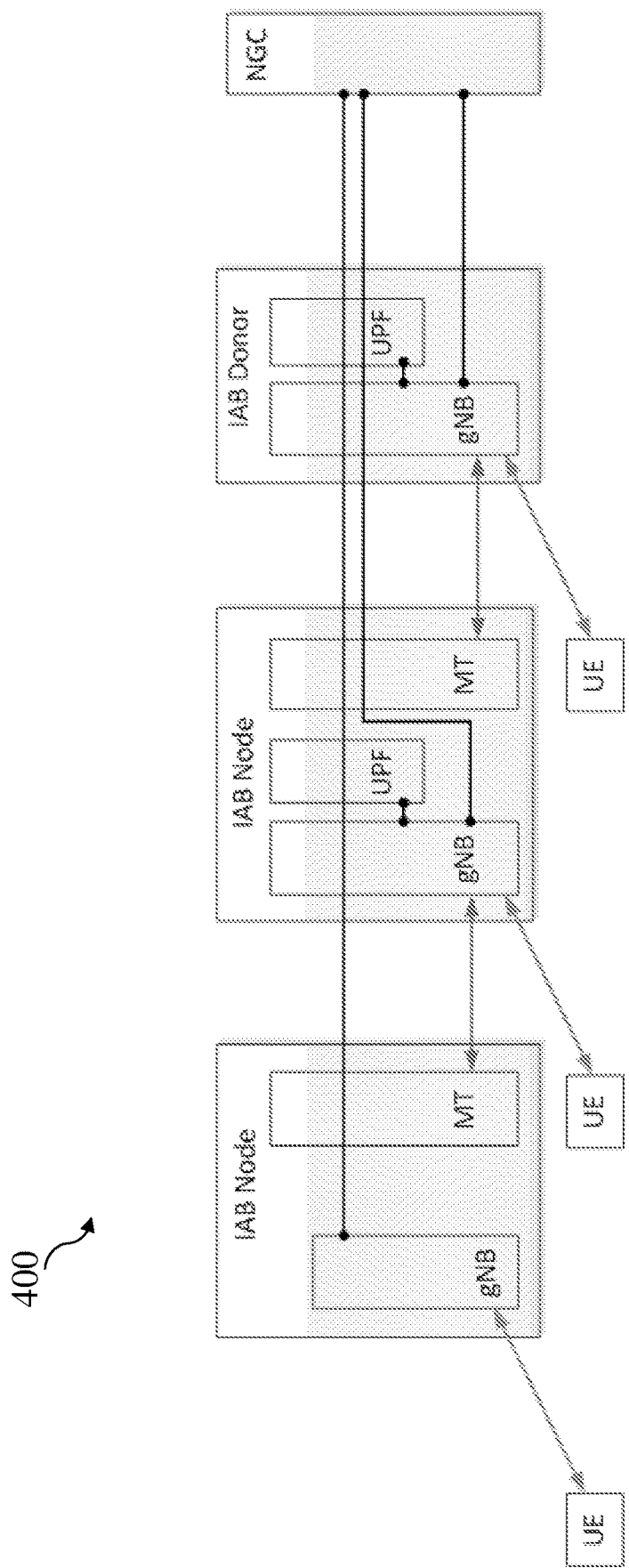
FIG. 4 illustrates a schematic wireless communication system according to an embodiment of the present disclosure.

FIG. 4 illustrates a wireless communication system 400 according to an embodiment of the present disclosure.

As shown in FIG. 4, the IAB nodes and the UEs may be connected to a NGC. Each IAB node may comprise a gNB and a MT. The IAB node may be connected to an upstream IAB node or an IAB donor via the MT, and may be connected to the UEs and a downstream IAB node via the gNB. The IAB node may further comprise a User Plane Function (UPF) that is collocated with the gNB in the IAB node. The IAB nodes in FIG. 4 may sometimes be referred to as Layer-3 (L3) IAB nodes. In some embodiments, the IAB nodes in FIG. 2, e.g., IAB nodes 0-3, may be L3 IAB nodes.

In a wireless communication system without RNs, such as a LTE communication system, a Radio Link Failure (RLF) between a UE and a BS may be declared in response to at least one of the following: a RLF timer (e.g., T310) expiry, Random Access (RA) failure, or Radio Link Control (RLC) retransmission achieving the maximum number. In response to the RLF, a UE may perform a re-establishment procedure. The UE may enter into an idle mode in response to a failure in the re-establishment procedure.

In a wireless communication system employing RNs, in response to a RLF on the Un interface between a RN and a DeNB, the RN may switch to a UE mode without Un subframe limitation and perform a normal contention based Random Access Channel (RACH) procedure. For example, referring to FIG. 1, in response to a RLF between the RN 20 and the Donor BS 10, the RN 20 may switch to a UE mode and perform a normal contention based RACH procedure. In response to a successful re-establishment, a RN subframe configuration is reconfigured. In response to a failure in the re-establishment, the RN may enter into an idle mode and try to recover. Meanwhile, the RN may stop the Uu interface between the RN and the UE(s) attached to the RN by, for example, stopping Master Information Block (MIB) and/or System Information Block 1 (SIB1) transmission.

In a wireless communication system supporting multi-hop relays, the wireless backhaul links may be broken, for example, due to some reasons such as blockage by moving objects such as vehicles, foliage (caused by seasonal changes), or new buildings (caused by infrastructure changes). Physically stationary IAB nodes may suffer from this problem. For example, as shown in FIG. 2, a RLF may occur on the backhaul link between IAB Donor and IAB node 3. In this example, IAB node 3 may switch to another Donor node (not shown) from IAB Donor. In another example, a RLF may occur on the backhaul link between two IAB nodes, such as IAB node 3 and IAB node 2. In this example, IAB node 2 may switch to a candidate IAB node, such as IAB node 0, from IAB node 3.

Referring to FIG. 2, in the case of a RLF on the backhaul link between IAB Donor and IAB node 3, if IAB node 3 fails to recover the backhaul link or re-establish a new backhaul link, IAB node 3 may need to handle the UEs attached to IAB node 3, the idle UEs, and its downstream IAB nodes, e.g., IAB node 2. IAB node 3 may stop the Uu interface between IAB node 3 and IAB node 2 by, for example, stopping MIB/SIB1 transmission. However, this may cause problems such as introducing latency to the wireless communication system because IAB node 2 may try to perform data retransmission and recovery the backhaul link. The downstream nodes of IAB node 2, e.g., IAB node 1 and IAB node 11 (not shown), as well as the UEs, e.g., UE 1, may experience longer delays in an attempt to resume the data transmission and/or reception.

Still referring to FIG. 2, in the case of a RLF on the backhaul link between IAB node 3 and IAB node 2, IAB node 2 may stop the Uu interface between IAB node 2 and its downstream IAB nodes, e.g., IAB node 1, for example, by stopping MIB/SIB1 transmission. In this case, IAB node 1, the downstream nodes of IAB node 1, e.g., IAB node 11 (not shown), and the UE, e.g., UE 1, may experience similar delays as described above.

Therefore, there is a need to reduce the above mentioned latency in the wireless communication system supporting multi-hop relays.

In addition, in response to a RLF in a backhaul link, the downstream node of the two IAB nodes which terminate the backhaul link may need to select a candidate node to re-establish the backhaul link. For example, in the above examples, IAB node 3 and IAB node 2 may need to select a candidate node to re-establish the backhaul links. Therefore, a procedure for selecting a candidate node in response to a RLF in the backhaul link is desirable.

Embodiments of the present disclosure propose technical solutions for backhaul link selection, which can at least solve the above technical problems in the new generation communication systems, such as 5G communication systems. More details on the embodiments of the present disclosure will be illustrated in the following text in combination with the appended drawings.

Figure 5:
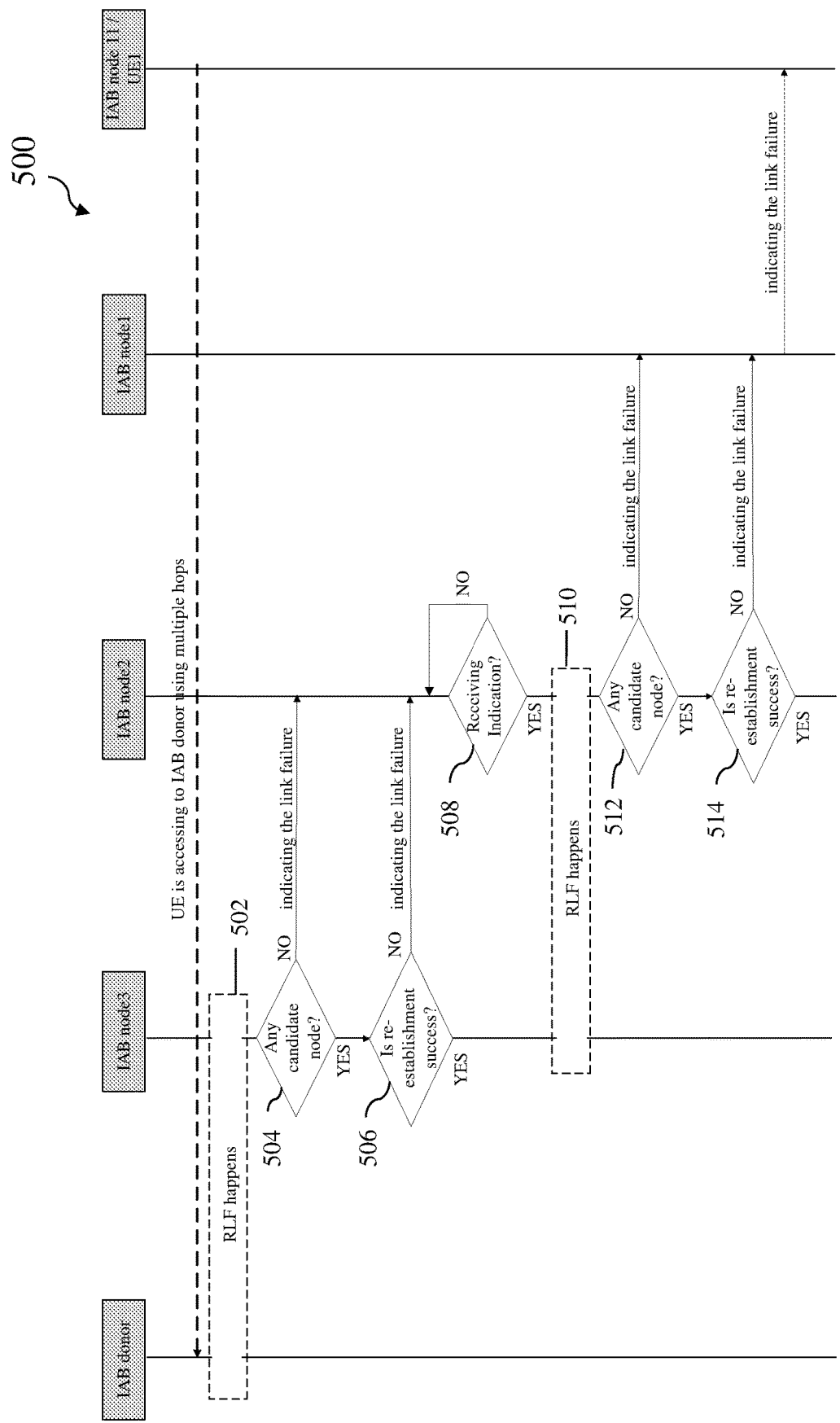
FIG. 5 illustrates an exemplary procedure for handling a failure in a backhaul link according to an embodiment of the present disclosure.

FIG. 5 illustrates an exemplary procedure 500 for handling a failure in a backhaul link according to an embodiment of the present disclosure.

In some embodiments, the procedure in FIG. 5 may occur in response to a RLF on the backhaul link between a Donor node and an IAB node, for example, IAB Donor and IAB node 3 in FIG. 2.

In these embodiments, at step 502, IAB node 3 may determine that a RLF timer expires. In one preferred embodiment, the RLF timer is timer T310, as defined in 3GPP specification TS 36.331. The expiry of the timer indicates that a RLF happens on the backhaul link between IAB node 3 and its upstream node, e.g., IAB Donor. At step 504, in response to the expiry of the timer, IAB node 3 may determine whether there is any candidate node available for backhaul link re-establishment. For example, it is checked whether there are neighboring IAB nodes available for backhaul link re-establishment. If it is determined that there is no candidate node for re-establishment, IAB node 3 may transmit a signaling message indicating a failure in the backhaul link to its downstream node, e.g., IAB node 2.

In some embodiments, the signaling message may comprise a RRC signaling message. In one embodiment, the RRC signaling message comprises an indication for the failure in the backhaul link and information indicating the two nodes which terminate the backhaul link. For example, the information may indicate that IAB node 3 and IAB donor terminate the backhaul link. In a preferred embodiment, the information may comprise node IDs for the two nodes. For example, the information may comprise node IDs for IAB node 3 and IAB donor. In another embodiment, the RRC signaling message comprises a RRC connection release message. The RRC connection release message is described in 3GPP specification TS 36.331. In this embodiment, the RRC connection release message comprises a release cause indication for the failure in the backhaul link. A new cause for the indication should be defined for the RRC connection release message, as defined in the 3GPP specification.

In other embodiments, the signaling message may comprise a Media Access Control (MAC) Control Element (CE) signaling message. The MAC CE signaling message is described in Section 6.1.3 of 3GPP specification TS 36.321. In one embodiment, the MAC CE signaling message comprises the indication for the failure in the backhaul link and/or the information indicating the two nodes which terminate the backhaul link. For example, the information may indicate that IAB node 3 and IAB donor terminate the backhaul link. In a preferred embodiment, the information may comprise node IDs for the two nodes. For example, the information may comprise node IDs for IAB node 3 and IAB donor. In these embodiments, the IAB nodes 2 and 3 may be a L2 IAB node shown in FIG. 3 or a L3 IAB node shown in FIG. 4.

In yet other embodiments, the signaling message may comprise a physical layer signaling message. In one embodiment, the physical layer signaling message comprises the indication for the failure in the backhaul link. In these embodiments, the IAB nodes 2 and 3 may be a L2 IAB node shown in FIG. 3 or a L3 IAB node shown in FIG. 4.

Otherwise, if it is determined that there are one or more candidate nodes for backhaul link re-establishment, IAB node 3 may select a node from the one or more candidate nodes. In some embodiments, IAB node 3 may select IAB node 0 as the node to perform re-establishment. The procedure for selecting the candidate node to re-establish the backhaul link will be described later.

At step 506, IAB node 3 may perform the backhaul link re-establishment with the selected node. In some embodiments, IAB node 3 may transmit a re-establishment request to IAB node 0. If the backhaul link re-establishment has failed, IAB node 3 may transmit a signaling message indicating the failure in the backhaul link to its downstream node, e.g., IAB node 2. The definition of the signaling message transmitted in this step is similar to the one transmitted in step 504, and thus is omitted herein.

At step 508, IAB node 2 may receive the signaling message indicating the failure in the backhaul link between IAB Donor and IAB node 3. At step 512, in response to receiving the signaling message, IAB node 2 may determine whether there is any candidate node available for backhaul link re-establishment. For example, it is checked whether there are neighboring IAB nodes available for backhaul link re-establishment. If it is determined that there is no available candidate node, IAB node 2 may transmit the received signaling message indicating the failure in the backhaul link to its downstream node, e.g., IAB node 1.

Otherwise, if it is determined that there are one or more candidate nodes for backhaul link re-establishment, IAB node 2 may select a node from the one or more candidate nodes. In some embodiments, IAB node 2 may select IAB node 0 as the node to perform re-establishment. The procedure for selecting the node to re-establish the backhaul link will be described later.

At step 514, IAB node 2 may perform the backhaul link re-establishment with the selected node. In some embodiments, IAB node 2 may transmit a re-establishment request to IAB node 0. If the backhaul link re-establishment has failed, IAB node 2 may transmit the received signaling message indicating the failure in the backhaul link to its downstream node, e.g., IAB node 1. In some embodiments, in response to receiving the signaling message from IAB node 2, IAB node 1 may perform a procedure similar to the exemplary procedure as described above with respect to steps 512 and 514, and may transmit the received signaling message to a downstream IAB node (e.g., IAB node 11) or a UE (e.g., UE 1).

In other embodiments, the procedure in FIG. 5 may occur in response to a RLF on the backhaul link between two IAB nodes, for example, IAB node 3 and IAB node 2 in FIG. 2.

In these embodiments, at step 510, IAB node 2 may determine that a RLF timer expires. In one preferred embodiment, the RLF timer is timer T310. The expiry of the timer indicates that a RLF happens on the backhaul link between IAB node 2 and its upstream node, e.g., IAB node 3. In response to the expiry of the timer, IAB node 2 may perform a procedure similar to the exemplary procedure as described above with respect to steps 512 and 514, except that the signaling message, if any, indicates the failure in the backhaul link between IAB node 3 and IAB node 2, and the two nodes which terminate the backhaul link are IAB node 3 and IAB node 2.

As mentioned above, an IAB node may select a node to re-establish a backhaul link. This procedure will be explained in detail in the following text.

Figure 6:
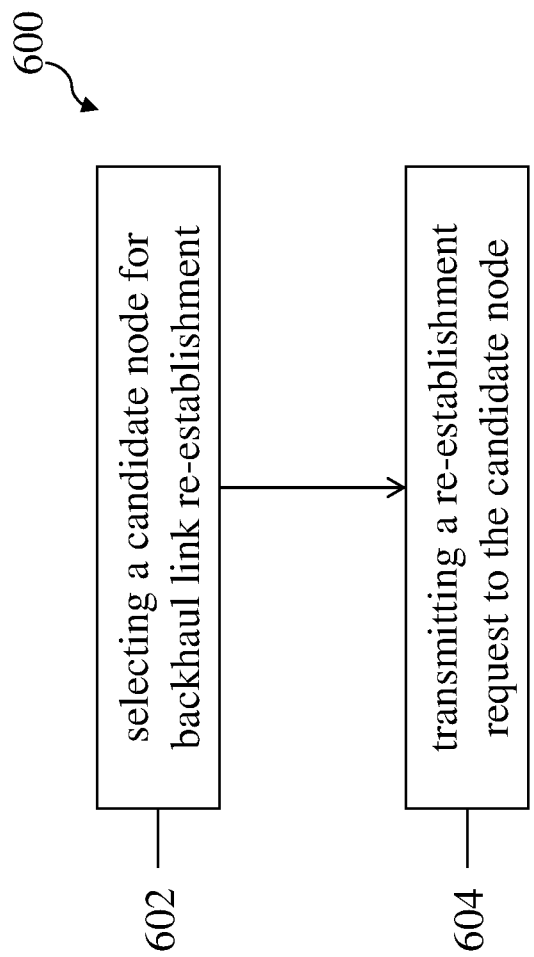
FIG. 6 illustrates an exemplary procedure for selecting a candidate node according to an embodiment of the present disclosure.

FIG. 6 illustrates an exemplary procedure 600 for selecting a candidate node according to an embodiment of the present disclosure. In some embodiments, the procedure in FIG. 6 may occur in response to a failure in the backhaul link.

At step 602, an IAB node may select a node for backhaul link re-establishment in response to a failure in a backhaul link.

In some embodiments, the IAB node may select the candidate node in response to an expiry of a timer. In one preferred embodiment, the timer is a RLF timer T310. For example, referring to FIG. 2, in response to the expiry of the timer T310, which indicates a RLF on the backhaul link between IAB node 3 and IAB Donor, IAB node 3 may select a candidate node for backhaul link re-establishment.

In other embodiments, the IAB node may select the candidate node in response to a reception of a signaling message indicating the failure in the backhaul link. The definition of the signaling message is similar to the one described with respect to FIG. 5, and thus is omitted herein. For example, referring to FIG. 2, in response to receiving the signaling message indicating the failure in the backhaul link between IAB Donor and IAB node 3, IAB node 2 may select a candidate node for backhaul link re-establishment.

In some embodiments, the IAB node may select the candidate node if it is determined that the channel quality between the candidate node and the IAB node is equal to or greater than a threshold for backhaul link selection. For example, as shown in FIG. 2, for IAB node 3 or 2, IAB node 0 may act as a candidate node for backhaul link re-establishment. IAB node 3 or 2 may select IAB node 0 for backhaul link re-establishment if the channel quality between IAB node 0 and IAB node 3 or 2 is equal to or greater than the threshold.

The threshold for backhaul link may be configured by a BS. In some embodiments, the IAB node may receive a RRC signaling message from the BS. The RRC signaling message comprises the threshold for backhaul link selection. For example, as shown in FIG. 2, IAB nodes 0-3 may receive a RRC signaling message indicating the threshold for backhaul link selection from IAB Donor.

In some embodiments, there may be a plurality of candidate nodes. In one embodiment, the IAB node may respectively determine the channel quality between the IAB node and each of the plurality of candidate nodes, and may respectively determine whether the channel quality between the IAB node and each of the plurality of candidate nodes is equal to or greater than a corresponding threshold for backhaul link. In this way, the IAB node may determine a number of candidate nodes from the plurality of candidate nodes. The IAB node may select a node for backhaul link re-establishment from the number of candidate nodes.

In some embodiments, the IAB node may further determine one or more candidate nodes from the number of candidate node. In one embodiment, it is determined that the one or more candidate nodes and the IAB node are connected to the same base station. In this embodiment, the IAB node may select a node for backhaul link re-establishment from the one or more candidate nodes.

In other embodiments, it is determined that each of the number of candidate nodes is connected to a different base station than the IAB node. The IAB node may randomly select a node from the number of candidate nodes for backhaul link.

If the selected node and the IAB node are connected to different base stations, the subsequent re-establishment will fail because the base station serving the selected node does not have the UE context, which is located in the CU of the base station serving the IAB node. However, if the selected node and the IAB node are connected to the same base station, the subsequent re-establishment may succeed because the base station has the UE context.

At step 604, the IAB node may transmit a re-establishment request to the selected node. In some embodiments, the IAB node may initiate a timer in response to the transmission of the re-establishment request. The IAB node may stop the timer in response to a successful link establishment between the IAB node and the selected node.

If the backhaul link re-establishment has failed and the timer has not expired, the IAB node may select another candidate node for re-establishment. The procedure for selecting this candidate node is similar to the exemplary procedure for selecting the node to perform re-establishment as described above.

If the timer expires before a successful re-establishment, the IAB node may transmit to another IAB node, e.g., a downstream IAB node, a signaling message indicating the failure in the backhaul link. Meanwhile, the IAB node may enter into an idle mode. The definition of the signaling message is similar to the one described with respect to FIG. 5, and thus is omitted herein.

As described above, in response to a RLF in the backhaul link, the IAB nodes may transmit an explicit signaling message to the downstream IAB nodes and the UEs. This is advantageous, especially in a wireless communication system supporting multi-hop relays, because it may reduce latency at the downstream IAB nodes and the UEs.

From another perspective, traffic variations may cause uneven load distribution on the wireless backhaul links, which would lead to congestion on local links or nodes. The network may then reconfigure the network routing or topology to mitigate the congestion. Topology adaptation refers to procedures that autonomously reconfigure the backhaul network under circumstances such as the above-mentioned blockage or local congestion without discontinuing services for the UEs. Therefore, a procedure for informing the network the change in the wireless backhaul links is also desirable.

Figure 7:
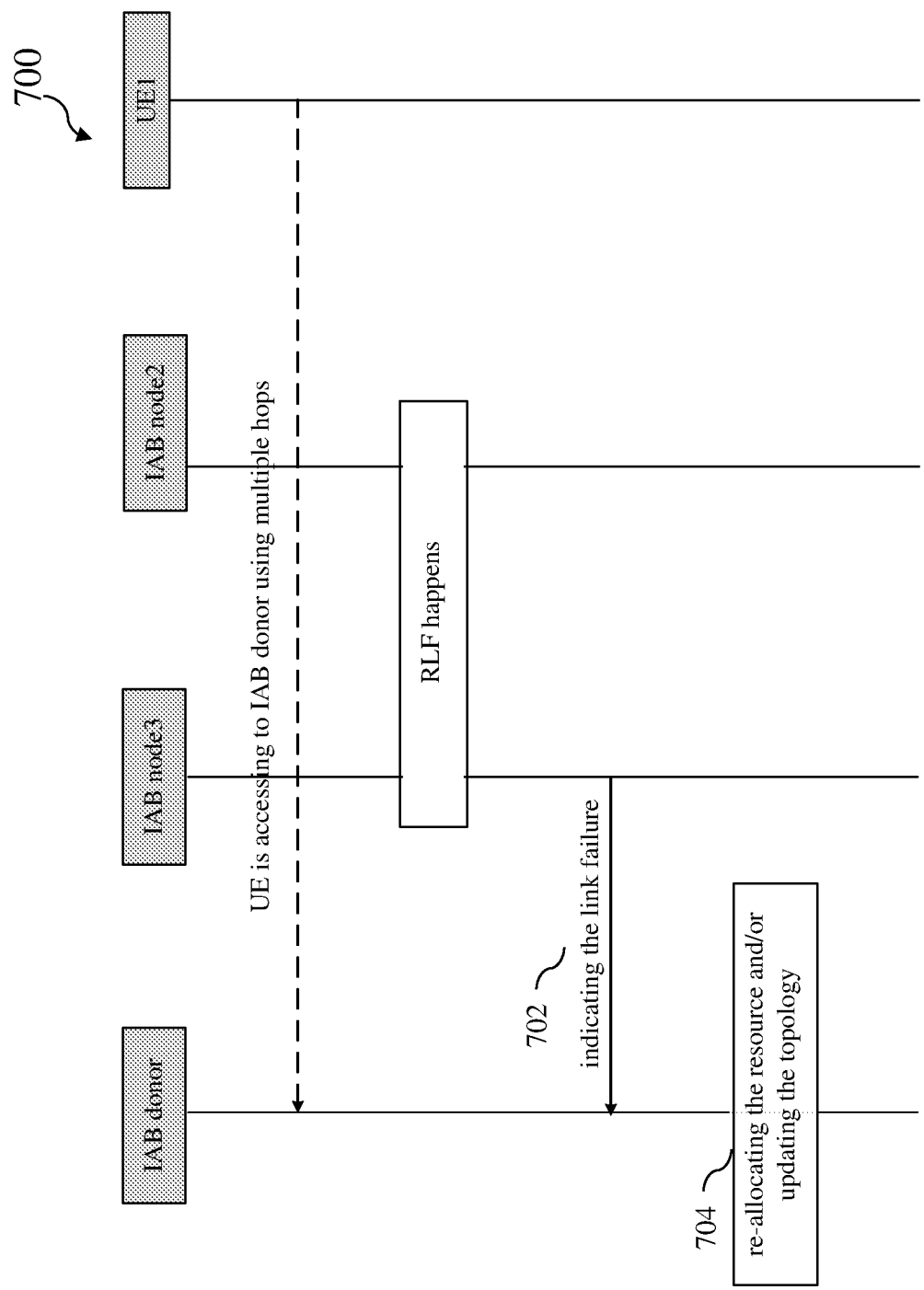
FIG. 7 illustrates an exemplary procedure for handling a failure in a backhaul link according to an embodiment of the present disclosure.

FIG. 7 illustrates an exemplary procedure 700 for handling a failure in a backhaul link according to an embodiment of the present disclosure. In some embodiments, the procedure in FIG. 7 may occur in response to a RLF on the backhaul link between two IAB nodes, for example, IAB nodes 2 and 3 in FIG. 2.

At step 702, an upstream node may receive from a downstream node connected to the upstream node a signaling message indicating a failure in a backhaul link. In some embodiments, as shown in FIGS. 2 and 7, IAB donor may receive a signaling message indicating a failure in a backhaul link between IAB nodes 2 and 3 from IAB node 3.

In some embodiments, the signaling message may comprise an indication for the failure in the backhaul link and information indicating two nodes which terminate the backhaul link. For example, the information may indicate that IAB node 3 and IAB node 2 terminate the backhaul link. In a preferred embodiment, the information may comprise node IDs for the two nodes. For example, the information may comprise node IDs for IAB node 3 and IAB node 2.

In some embodiments, the signaling message may comprise a RRC signaling message. In other embodiments, the signaling message may comprise MAC CE signaling message. In yet other embodiments, the signaling message may comprise a physical layer signaling message. In the above embodiments, the RRC signaling message, the MAC CE signaling message, and the physical layer signaling message are similar to those messages as described above with respect to FIG. 5.

At step 704, the upstream node may re-allocate the resource assigned to the failed backhaul link, and/or update a topology of a backhaul network. For example, as shown in FIGS. 2 and 7, IAB Donor may re-allocate the resource assigned to the backhaul link between IAB node 3 and IAB node 2, and/or update the topology of the backhaul network.

It is advantageous to inform the upstream node in response to a RLF in the backhaul link by explicit signaling because it allows the upstream node to rapidly release the reserved resource for the failed link and update the topology of the backhaul network.

In the above embodiments, it is assumed for simplicity that the RLF happens on certain backhaul links, for example, the backhaul link between IAB nodes 2 and 3 or the backhaul link between IAB Donor and IAB node 3 as shown in FIG. 2. However, link failure may happen on any backhaul link. In these cases, the above procedure may be similarly applied.

Figure 8:
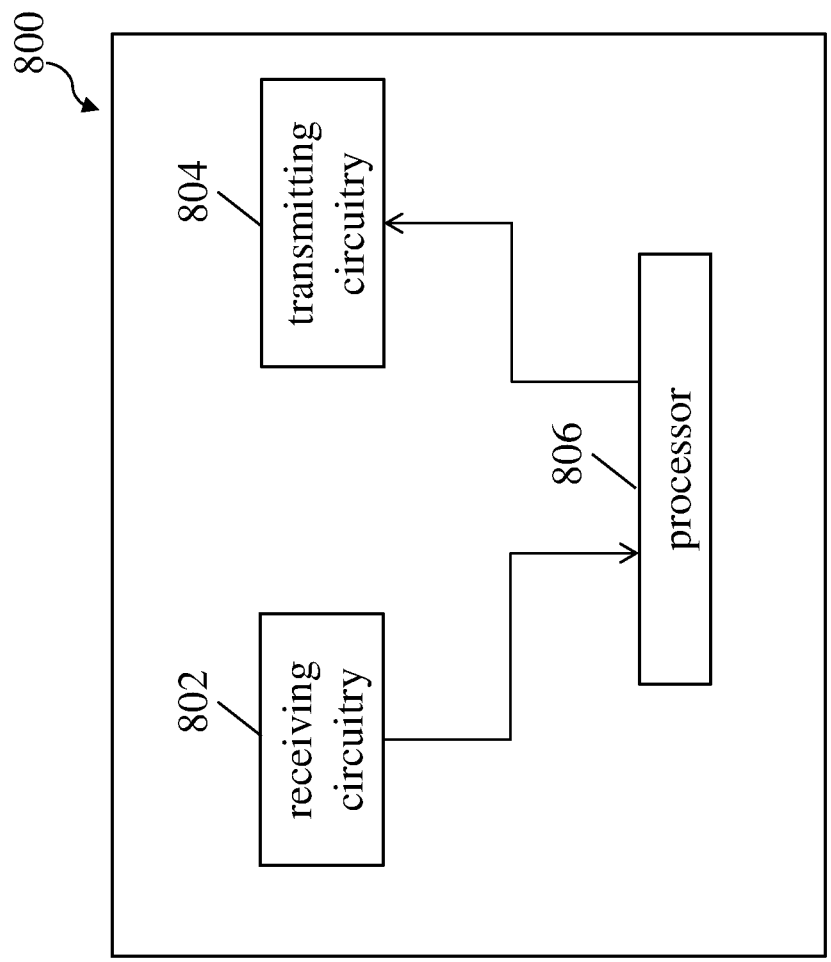
FIG. 8 illustrates an example block diagram of an apparatus according to an embodiment of the present disclosure.

FIG. 8 illustrates a block diagram of an apparatus 800 according to an embodiment of the present disclosure.

As shown in FIG. 8, the apparatus 800 may include a non-transitory computer-readable medium (not shown), a receiving circuitry 802, a transmitting circuitry 804, and a processor 806 coupled to the non-transitory computer-readable medium, the receiving circuitry and the transmitting circuitry. The apparatus 800 may be a BS or a relay. Although in this figure, elements such as processor, transmitting circuitry, and receiving circuitry are described in the singular, the plural is contemplated unless limitation to the singular is explicitly stated. In some embodiments, the receiving circuitry 802 and the transmitting circuitry 804 are combined into a single device, such as a transceiver. In certain embodiments, the apparatus 800 may further include an input device, a memory, and/or other components.

In some embodiments, the non-transitory computer-readable medium may have stored thereon computer-executable instructions to cause a processor to implement the method with respect to the IAB node as described above. For example, the computer-executable instructions, when executed, cause the processor 806 interacting with receiving circuitry 802 and transmitting circuitry 804, so as to perform the steps with respect to the IAB node depicted in FIGS. 2-6.

In other embodiments, the non-transitory computer-readable medium may have stored thereon computer-executable instructions to cause a processor to implement the method with respect to the base station as described above. For example, the computer-executable instructions, when executed, cause the processor 806 interacting with receiving circuitry 802 and transmitting circuitry 804, so as to perform the steps with respect to the BS depicted in FIGS. 2 and 7.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The following is what is claimed:

1. A method performed by an integrated access and backhaul (IAB) node, the method comprising:

determining a failure in a backhaul link between the IAB node and an uplink IAB node;

in response to determining the failure in the backhaul link, determining whether there is another IAB node available for backhaul link reestablishment; and in response to determining that there is not another IAB node available for backhaul link reestablishment, transmitting, to a downlink IAB node, a signaling message indicating the failure in the backhaul link.

2. The method of claim 1, wherein the signaling message comprises a radio resource control (RRC) signaling message, a media access control (MAC) control element (CE) signaling message, or a physical layer signaling message.

3. The method of claim 2, wherein the RRC signaling message comprises an indication for the failure in the backhaul link and information indicating two nodes which terminate the backhaul link, or a RRC connection release message having a release cause indication for the failure in the backhaul link;

wherein the MAC CE signaling message comprises the indication for the failure in the backhaul link or the information indicating the two nodes which terminate the backhaul link; and wherein the physical layer signaling message comprises the indication for the failure in the backhaul link.

4. The method of claim 3, wherein the information indicating the two nodes comprises node identifiers for the two nodes.

5. The method of claim 1, wherein the signaling message is transmitted in response to an expiry of a timer and a determination that no candidate node is available for backhaul link re-establishment.

6. The method of claim 1, further comprising:
selecting a candidate node for backhaul link re-establishment in response to an expiry of a timer; and
performing backhaul link re-establishment with the selected candidate node;
wherein the signaling message is transmitted in response to a failure in the backhaul link re-establishment.

7. The method of claim 1, further comprising:
receiving the signaling message indicating the failure in the backhaul link.

8. The method of claim 7, wherein the signaling message is transmitted in response to a determination that no candidate node is available for backhaul link re-establishment.

9. The method of claim 7, further comprising:
selecting a candidate node for backhaul link re-establishment; and
performing backhaul link re-establishment with the selected candidate node;
wherein the signaling message is transmitted in response to a failure in the backhaul link re-establishment.

10. A method performed by an integrated access and backhaul (IAB) node, the method comprising:
receiving, from a first uplink IAB node, a signaling message indicating a failure in a backhaul link, wherein the signaling message indicates that the first uplink IAB node determined a failure in the backhaul link between the first uplink IAB node and a second uplink IAB node, and that the first uplink IAB node determined there was not another IAB node available for backhaul link reestablishment.

11. The method of claim 10, wherein the signaling message comprises an indication for the failure in the backhaul link and information indicating two nodes which terminate the backhaul link, and the information comprises node identifiers for the two nodes.

12. A method performed by an integrated access and backhaul (IAB) node, the method comprising:
determining a failure in a backhaul link between the IAB node and an uplink IAB node;
in response to determining the failure in the backhaul link, selecting a candidate node for backhaul link re-establishment; and
transmitting a re-establishment request to the candidate node.

13. The method of claim 12, wherein selecting the candidate node for backhaul link re-establishment comprises:
selecting the candidate node in response to an expiry of a timer or a reception of a signaling message indicating the failure in the backhaul link.

14. The method of claim 12, further comprising:
determining that a channel quality between the candidate node and the IAB node is equal to or greater than a threshold for backhaul link selection.

15. The method of claim 14, further comprising:
receiving a radio resource control (RRC) signaling message from a base station, wherein the RRC signaling message comprises the threshold for backhaul link selection.

16. The method of claim 14, wherein selecting the candidate node for backhaul link re-establishment comprises:
selecting the candidate node from one or more candidate nodes for backhaul link, wherein the one or more candidate nodes and the IAB node are connected to the same base station.

17. The method of claim 14, wherein selecting the candidate node for backhaul link re-establishment comprises:
determining one or more candidate nodes for backhaul link, wherein the one or more candidate nodes and the IAB node are connected to different base stations; and
randomly selecting the candidate node from the one or more candidate nodes for backhaul link.

18. The method of claim 12, further comprising:
initiating a timer in response to transmission of the re-establishment request.

19. The method of claim 18, further comprising:
stopping the timer in response to a successful link establishment between the IAB node and the candidate node; and
in response to an expiry of the timer:
transmitting, to another communication device, a signaling message indicating the failure in the backhaul link; and
entering into an idle mode.

20. An integrated access and backhaul (IAB) node, comprising:
at least one memory; and
at least one processor coupled with the at least one memory and configured to cause the IAB node to:
determine a failure in a backhaul link between the IAB node and an uplink IAB node;
in response to determining the failure in the backhaul link, determine whether there is another IAB node available for backhaul link reestablishment; and
in response to determining that there is not another IAB node available for backhaul link reestablishment, transmit, to a downlink IAB node, a signaling message indicating the failure in the backhaul link.

* * * * *